(12) United States Patent
Abali et al.

(10) Patent No.: US 11,573,899 B1
(45) Date of Patent: Feb. 7, 2023

(54) TRANSPARENT INTERLEAVING OF COMPRESSED CACHE LINES

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US); Brian Robert Prasky, Campbell Hall, NY (US); Deanna Postles Dunn Berger, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/451,763

(22) Filed: Oct. 21, 2021

(51) Int. Cl.
*G06F 12/0846* (2016.01)

(52) U.S. Cl.
CPC .. *G06F 12/0851* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 10,048,868 B2 | 8/2018 | Alameldeen et al. | |
| 10,191,850 B2 | 1/2019 | Verrilli et al. | |
| 10,261,910 B2 | 4/2019 | Turner et al. | |
| 10,585,798 B2 | 3/2020 | Gray et al. | |
| 10,783,084 B2 | 9/2020 | Appu et al. | |
| 10,831,655 B2 | 11/2020 | Arelakis et al. | |
| 10,860,489 B2 | 12/2020 | Das et al. | |
| 10,866,891 B2 | 12/2020 | Hagersten et al. | |
| 2002/0116567 A1* | 8/2002 | Vondran, Jr. | G06F 12/1045 711/E12.047 |
| 2003/0131184 A1 | 7/2003 | Kever | |
| 2005/0027942 A1* | 2/2005 | Ulrich | G06F 12/0851 711/E12.047 |
| 2005/0144387 A1* | 6/2005 | Adl-Tabatabai | G06F 12/121 711/E12.07 |
| 2006/0184734 A1* | 8/2006 | Fluhr | G06F 12/0886 711/E12.045 |
| 2007/0016729 A1* | 1/2007 | Correale | G06F 12/0864 711/E12.047 |

(Continued)

OTHER PUBLICATIONS

Pekhimenko et al., "Base-Delta-Immediate Compression: Practical Data Compression for On-Chip Caches", Carnegie Mellon University, Sep. 2012 (pp. 12).

Tsai et al., "Compress Objects, Not Cache Lines: An Object-Based Compressed Memory Hierarchy", Proceedings of 2019 Architectural Support for Programming Languages and Operating Systems (ASPLOS'19), New York, 2019 (pp. 14).

(Continued)

*Primary Examiner* — Yaima Rigol
(74) *Attorney, Agent, or Firm* — Griffiths & Seaton PLLC

(57) ABSTRACT

Low latency in a non-uniform cache access ("NUCA") cache in a computing environment is provided. A first compressed cache line is interleaved with a second compressed cache line into a single cache line of the NUCA cache, where data of the first compressed cache line is stored in one or more even sectors in the single cache line and stored in zero or more odd sectors in the single cache line after the data fills the one or more even sectors, and data of the second compressed cache line is stored in the one or more odd sectors in the single cache line and stored in zero or more even sectors in the single cache line after the data fills the one or more odd sectors.

20 Claims, 12 Drawing Sheets

(56) References Cited

U.S. PATENT DOCUMENTS

| | | | |
|---|---|---|---|
| 2010/0274973 A1* | 10/2010 | Balakrishnan | G06F 12/0846 |
| | | | 711/E12.024 |
| 2011/0271055 A1* | 11/2011 | O'Connor | H03M 7/30 |
| | | | 711/E12.017 |
| 2016/0034388 A1* | 2/2016 | Yeh | G06F 12/0246 |
| | | | 711/103 |
| 2016/0041905 A1* | 2/2016 | Turner | G06F 12/0886 |
| | | | 711/3 |
| 2017/0192899 A1* | 7/2017 | Zhang | G06F 12/0895 |
| 2019/0243780 A1 | 8/2019 | Gopal et al. | |
| 2020/0285466 A1* | 9/2020 | Kotra | G06F 9/223 |
| 2021/0056030 A1 | 2/2021 | Diamand et al. | |
| 2021/0056036 A1 | 2/2021 | Breslow et al. | |
| 2021/0365376 A1* | 11/2021 | Roberts | G06F 12/0897 |

OTHER PUBLICATIONS

Pekhimenko et al., "Linerarly Compressed Pages: A Main Memory Compression Framework with Low Complexity and Low Latency", Carnegie Mellon University, Sep. 8, 2012 (pp. 22).

Liu et al., "Building Energy-Efficient Multi-Level Cell STT-RAM Caches with Data Compression", Department of Electrical and Computer Engineering, University of California, Santa Barbara, 2017 (pp. 6).

Bartolini et al., "Exploring the Relationship between Architectures and Management Policies in the design of NUCA-based Chip Multicore Systems", Future Generation Computer Systems, Jun. 2018, (pp. 30).

\* cited by examiner

FIG. 7

TRANSPARENT INTERLEAVING OF COMPRESSED CACHE LINES

BACKGROUND

The present invention relates in general to computing systems, and more particularly, to various embodiments for providing transparent interleaving of compressed cache lines for lower latency in a non-uniform cache access ("NUCA") cache in a computing systems using a computing processor.

SUMMARY

According to an embodiment of the present invention, a method for transparent interleaving of compressed cache lines for lower latency in a non-uniform cache access ("NUCA") cache in a computing environment, by one or more processors, is depicted. A first compressed cache line is interleaved with a second compressed cache line into a single cache line of the NUCA cache, where data of the first compressed cache line is stored in one or more even sectors in the single cache line and stored in zero or more odd sectors (if necessary) in the single cache line after the data fills the one or more even sectors, and data of the second compressed cache line is stored in the one or more odd sectors in the single cache line and stored in zero or more even sectors (if necessary) in the single cache line after the data fills the one or more odd sectors.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

FIG. 7 is a block diagram depicting a compressed cache line in a computing environment according to an embodiment of the present invention.

DETAILED DESCRIPTION OF THE DRAWINGS

Figure 1:
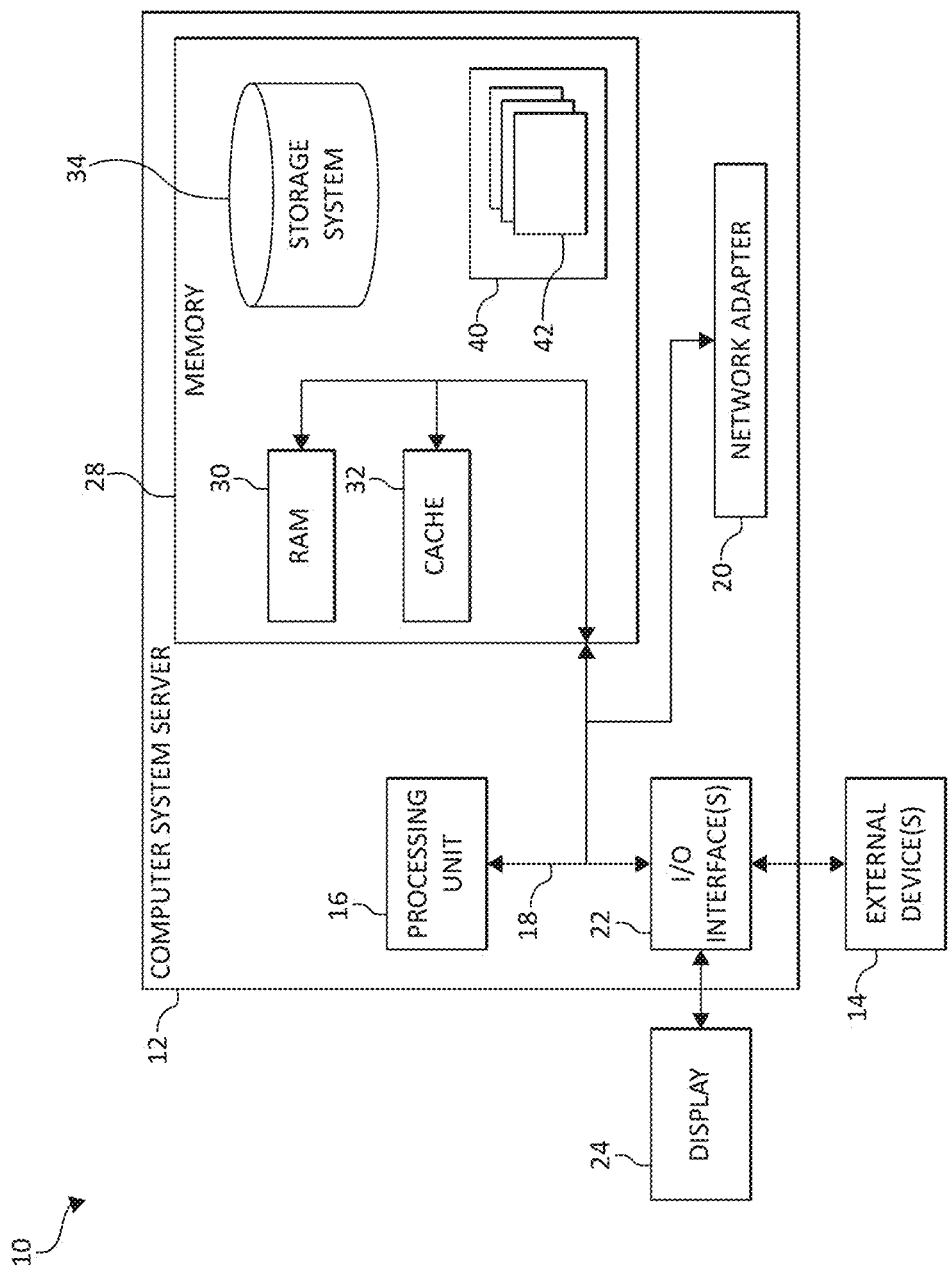
FIG. 1 is a block diagram depicting an exemplary cloud computing node according to an embodiment of the present invention.

In order to reduce or avoid the time delay (or "latency") of accessing data stored in the main memory of a computer, modern computer processors include a cache memory (or "cache") that stores recently accessed data so that it can be quickly accessed again by the processor. Data that is stored in a cache can be quickly accessed by a processor without the need to access the main memory (or "memory"), thereby increasing the performance of the processor and the computer overall.

Several different layers of cache may be provided in a computer system. Level 1 (or primary) cache, for example, is used to store data on behalf of system memory (which comprises random access memory, i.e., RAM) for access by a processor. Level 1 ("L1") cache can be built directly into the processor and can run at the same speed as the processor, providing the fastest possible access time. Level 2 (or secondary) ("L2") cache is also used to store a portion of system memory and may be included within a chip package but is separate from the processor. Level 2 cache has greater capacity than Level 1 cache but is slower. Some systems may even include Level 3 ("L3") cache that has even greater capacity than Level 2 cache. However, Level 3 cache is typically slower than Level 2 cache, yet still faster than the primary storage device, and may be located off the chip package.

Data in a cache are stored in "lines," which are contiguous chunks of data (i.e., being a power-of-2 number of bytes long, aligned on boundaries corresponding to this size). That is, data is typically transferred and accessed in groupings known as cache lines, which may include more than one item of data. However, a challenge surfaces when it is necessary or desired to compress cache lines in a Non-Uniform Cache Architecture ("NUCA") cache while enabling the compressed cache lines to be transparent to a cache while minimizing latency and bandwidth. It should be noted that a NUCA cache flattens the conventional multi-level cache hierarchy by using a fewer numbers of cache hierarchy levels with a large number of banks of the same memory technology (e.g., static random access memory ("SRAM") or embedded dynamic random access memory "EDRAM") in each level of the cache hierarchy. As a consequence of the physical structure of such cache architectures, entries in different banks of the same cache memory have non-uniform access times dependent on physical position, giving rise to the term NUCA.

Thus, the present invention provides for transparent interleaving of compressed cache lines for lower latency in a non-uniform cache access ("NUCA") cache in a computing environment, by one or more processors, is depicted. A first compressed cache line is interleaved with a second compressed cache line into a single cache line of the NUCA cache, wherein data of the first compressed cache line is stored in one or more even sectors in the single cache line and stored in zero or more odd sectors in the single cache line after the data fills the one or more even sectors, and data of the second compressed cache line is stored in the one or more odd sectors in the single cache line and stored in zero or more even sectors in the single cache line after the data fills the one or more odd sectors.

That is, for interleaving a first compressed cache line with a second compressed cache line into a single cache line of the NUCA cache, while the first compressed line starts storing data in the even sectors, the first compressed line is permitted/allowed to leverage the odd sectors (if necessary) for data storage upon using all the even sectors (e.g., the even sectors are filled). Similarly, the second compressed line starts storing data in the odd sectors, and the second compressed line is permitted/allowed to leverage the even sectors (if necessary) for data storage upon using all the odd sectors (e.g., the odd sectors are filled).

In an additional aspect, the present invention provides low latency in a non-uniform cache access ("NUCA") cache in a computing environment is provided. A first compressed cache line is interleaved with a second compressed cache line into a single cache line of the NUCA cache, where data of the first compressed cache line is stored in one or more even sectors in the single cache line and stored in zero or more odd sectors in the single cache line after the data fills the one or more even sectors, and data of the second compressed cache line is stored in the one or more odd sectors in the single cache line and stored in zero or more even sectors in the single cache line after the data fills the one or more odd sectors. That is, for the first compressed line, which starts in even sectors, it may extend into the odd sectors if needed. Therefore, odd sector usage is zero or more. Similarly, for the second compressed line, which starts in the odd sectors, will only use even sectors if needed (and fits) and hence leverages zero or more even sectors, not one or more even sectors.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It should be noted that a cognitive system may also perform one or more calculations that may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, PE's, and/or machine learning models/machine learning pipelines, but there may be a variety of factors that may result in alternate suggestion of a combination of operations, schedules, PE's, and/or machine learning models/machine learning pipelines yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
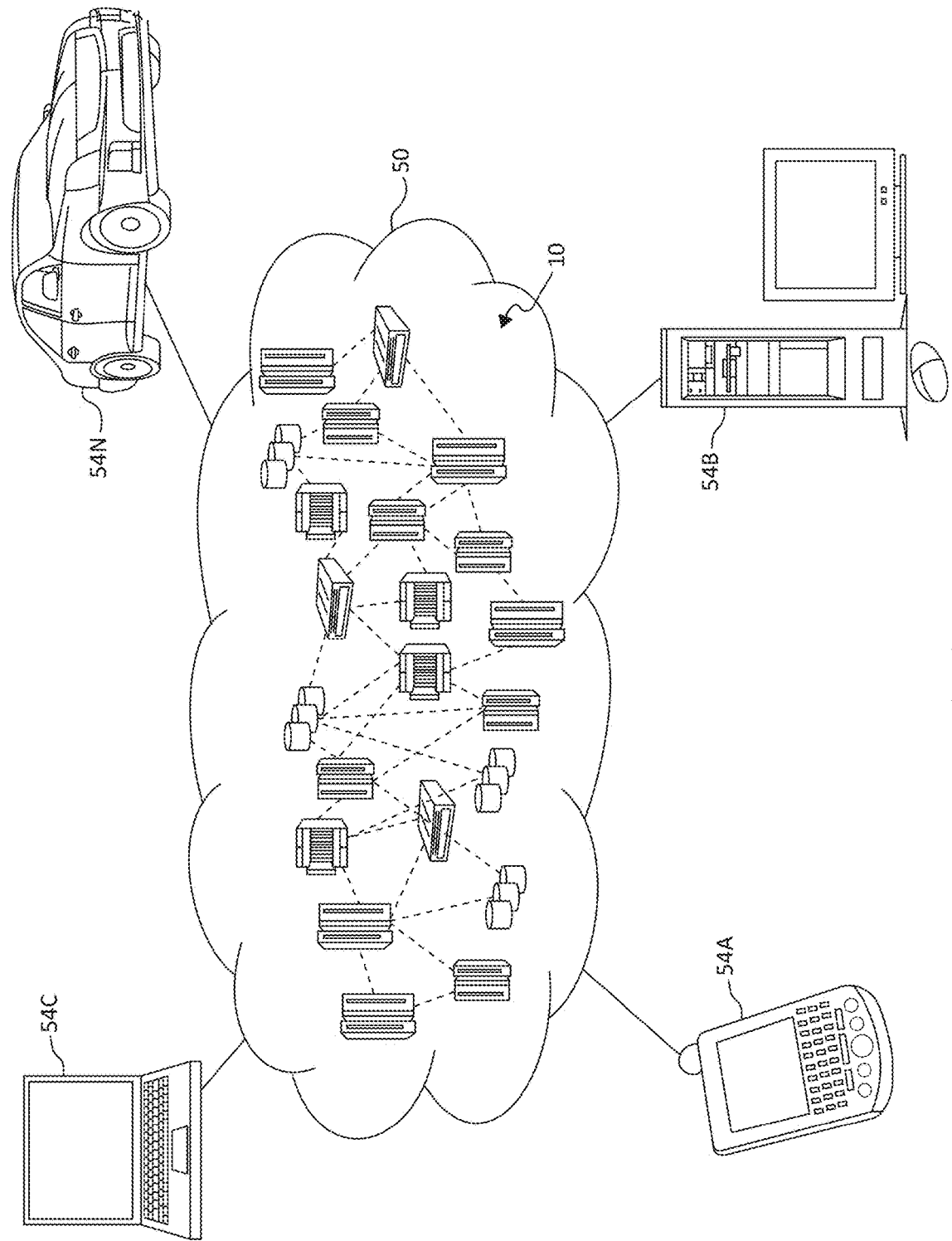
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
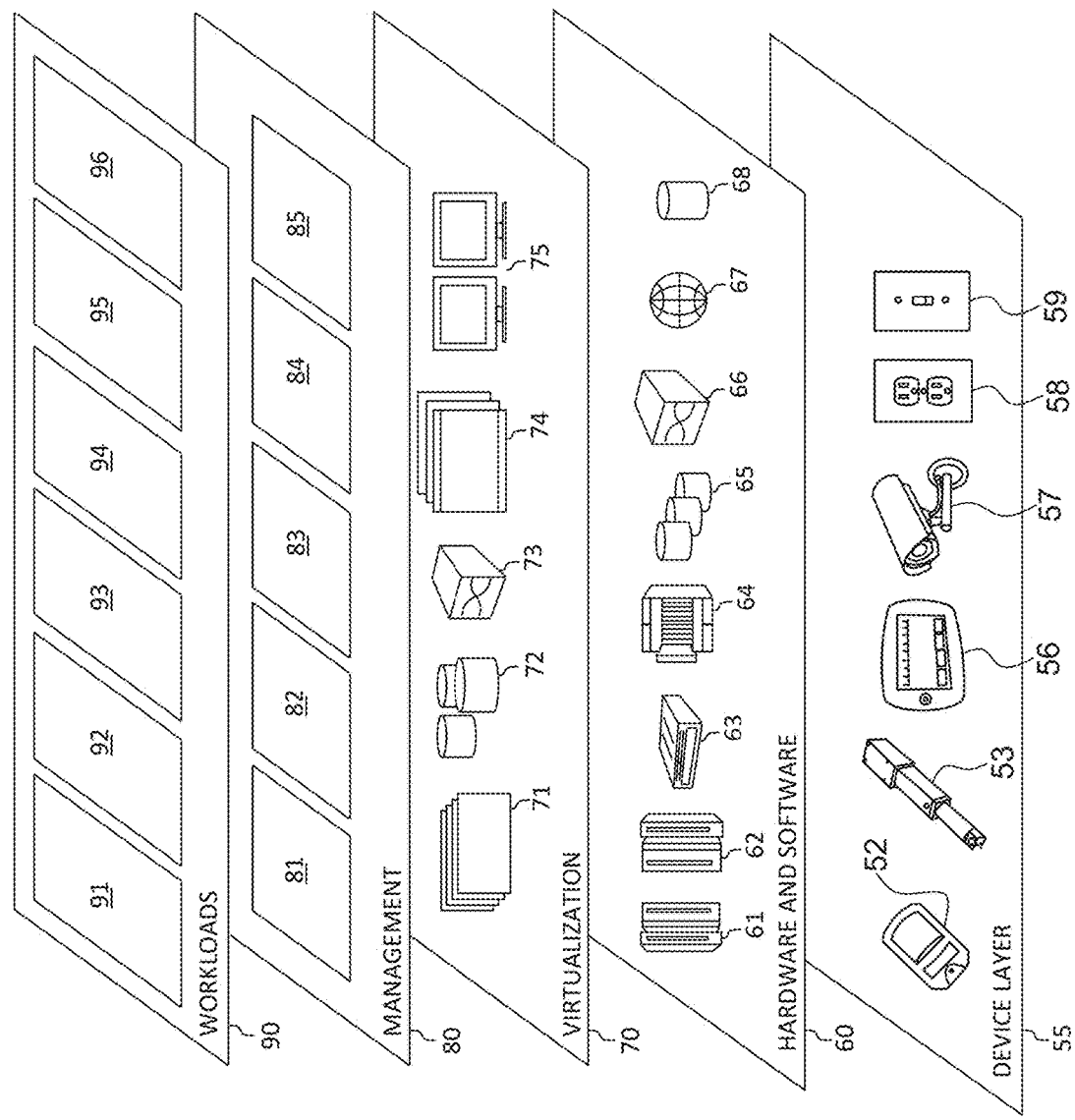
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and, in the context of the illustrated embodiments of the present invention, various workloads and functions 96 for providing transparent interleaving of compressed cache lines for lower latency in a cache in a computing environment (e.g., in a neural network architecture). In addition, workloads and functions 96 for providing transparent interleaving of compressed cache lines for lower latency in a cache in a computing environment may include such operations as interleaving and as will be further described, user and device management functions. One of ordinary skill in the art will appreciate that the workloads and functions 96 for providing transparent interleaving of compressed cache lines for lower latency in a cache in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing transparent interleaving of compressed cache lines for lower latency in a cache in a computing environment, by one or more processors. A first compressed cache line is interleaved with a second compressed cache line into a single cache line of the NUCA cache, where data of the first compressed cache line is stored in one or more even sectors in the single cache line and stored in zero or more odd sectors in the single cache line after the data fills the one or more even sectors, and data of the second compressed cache line is stored in the one or more odd sectors in the single cache line and stored in zero or more even sectors in the single cache line after the data fills the one or more odd sectors.

In some implementations, a cache line may require 8 sectors. In other implementations, a cache line may be implemented with 10 sectors or N number of sectors, where N is a positive integer. Similarly, there may be a total odd sector count such as 9. Also, while in an uncompressed format, this extra 25% data storage area does not provide greater storage. However, this extra area enables greater/increased cache line when compressing in the event that two cache lines fail to compress down to 8 sectors but can compress down another number of sector such as, for example, 9 or 10 sectors.

Figure 4:
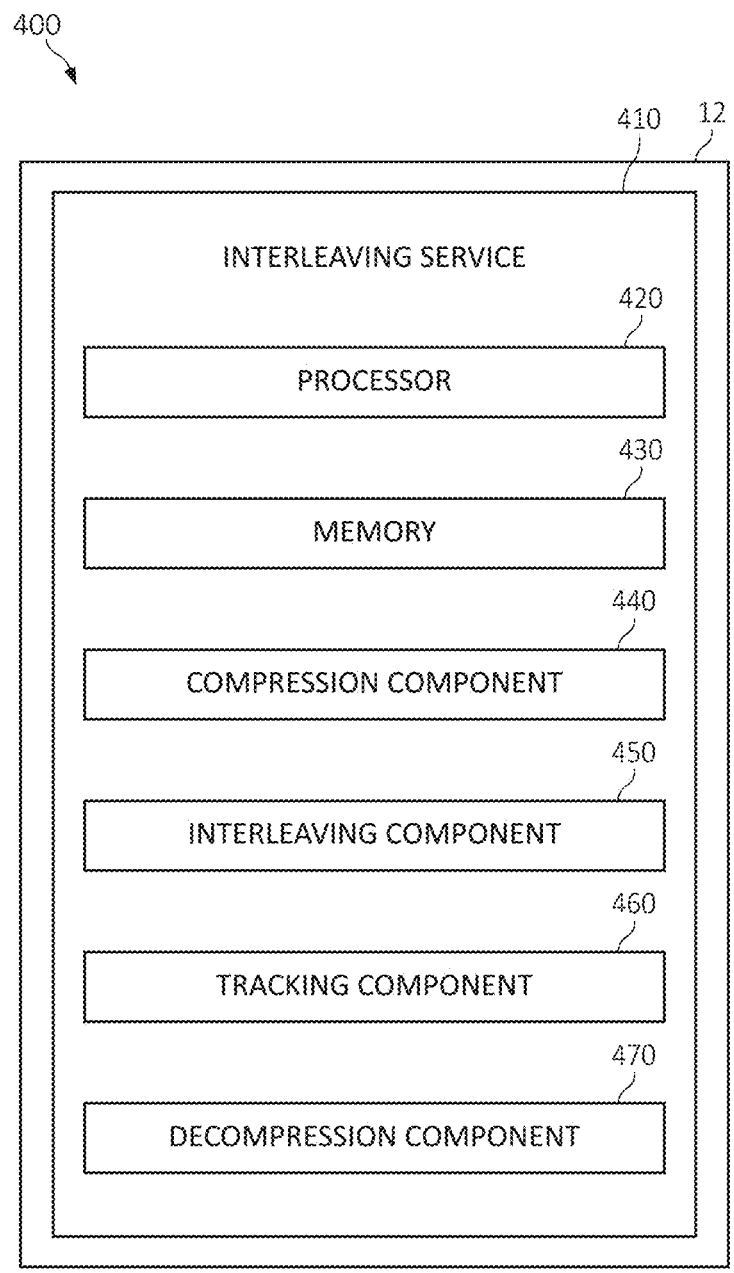
FIG. 4 is an additional block diagram depicting an exemplary functional relationship between various aspects of the present invention.

Turning now to FIG. 4, a block diagram depicting exemplary functional components of system 400 for providing transparent interleaving of compressed cache lines for lower latency in a cache in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

An interleaving service 410 is shown, incorporating processing unit 420 ("processor") to perform various computational, data processing and other functionality in accordance with various aspects of the present invention. In one aspect, the processor 420 and memory 430 may be internal and/or external to the interleaving service 410, and internal and/or external to the computing system/server 12. The interleaving service 410 may be included and/or external to the computer system/server 12, as described in FIG. 1. The processing unit 420 may be in communication with the memory 430. The interleaving service 410 may include a compression component 440, an interleaving component 450, a tracking component 460, and a decompression component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The interleaving service 410 may, using the compression component 440, the interleaving component 450, the tracking component 460, and the decompression component 470 monitor interleave a first compressed cache line with a second compressed cache line into a single cache line of the NUCA cache, wherein data of the first compressed cache line is stored in one or more even sectors in the single cache line and stored in zero or more odd sectors in the single cache line after the data fills the one or more even sectors, and data of the second compressed cache line is stored in the one or more odd sectors in the single cache line and stored in zero or more even sectors in the single cache line after the data fills the one or more odd sectors. That is, for interleaving a first compressed cache line with a second compressed cache line into a single cache line of the NUCA cache, while the first compressed line starts storing data in the even sectors, the first compressed line is allowed to leverage the odd sectors for data storage upon using all the even sectors (e.g., the even sectors are filled). Similarly, the second compressed line starts storing data in the odd sectors, the second compressed line is allowed to leverage the even sectors for data storage upon using all the odd sectors (e.g., the odd sectors are filled).

The tracking component 460 may track the total number of sectors (e.g., tracks all odd and even sectors) consumed by the first compressed cache line. That is, the tracking component 460 tracks the total number of sectors (e.g., odd and even sectors) used for the given compressed line. The tracking component 460 may track data of the first compressed cache line that is stored in one or more even sectors in the single cache line and stored in zero or more odd sectors in the single cache line after the data fills the one or more even sectors. The tracking component 460 may track data of the second compressed cache line that is stored in the one or more odd sectors in the single cache line and that is stored in zero or more even sectors in the single cache line after the data fills the one or more odd sectors. Thus, the tracking component 460 may track a total number of even and odd sectors for all compressed cache lines.

The compression component 440 may compress the first compressed cache line prior to the interleaving with the second cache line. The compression component 440 may compress the second compressed cache line prior to the interleaving with the first cache line.

The decompression component 470 may decompress data of the one or more even sectors of the first compressed cache line based on an order in which the first compressed cache line was interleaved with the second cache line. The decompression component 470 may decompress data of the one or more odd sectors of the second compressed cache line based on an order in which the second compressed cache line was interleaved with the first cache line.

Figure 5:
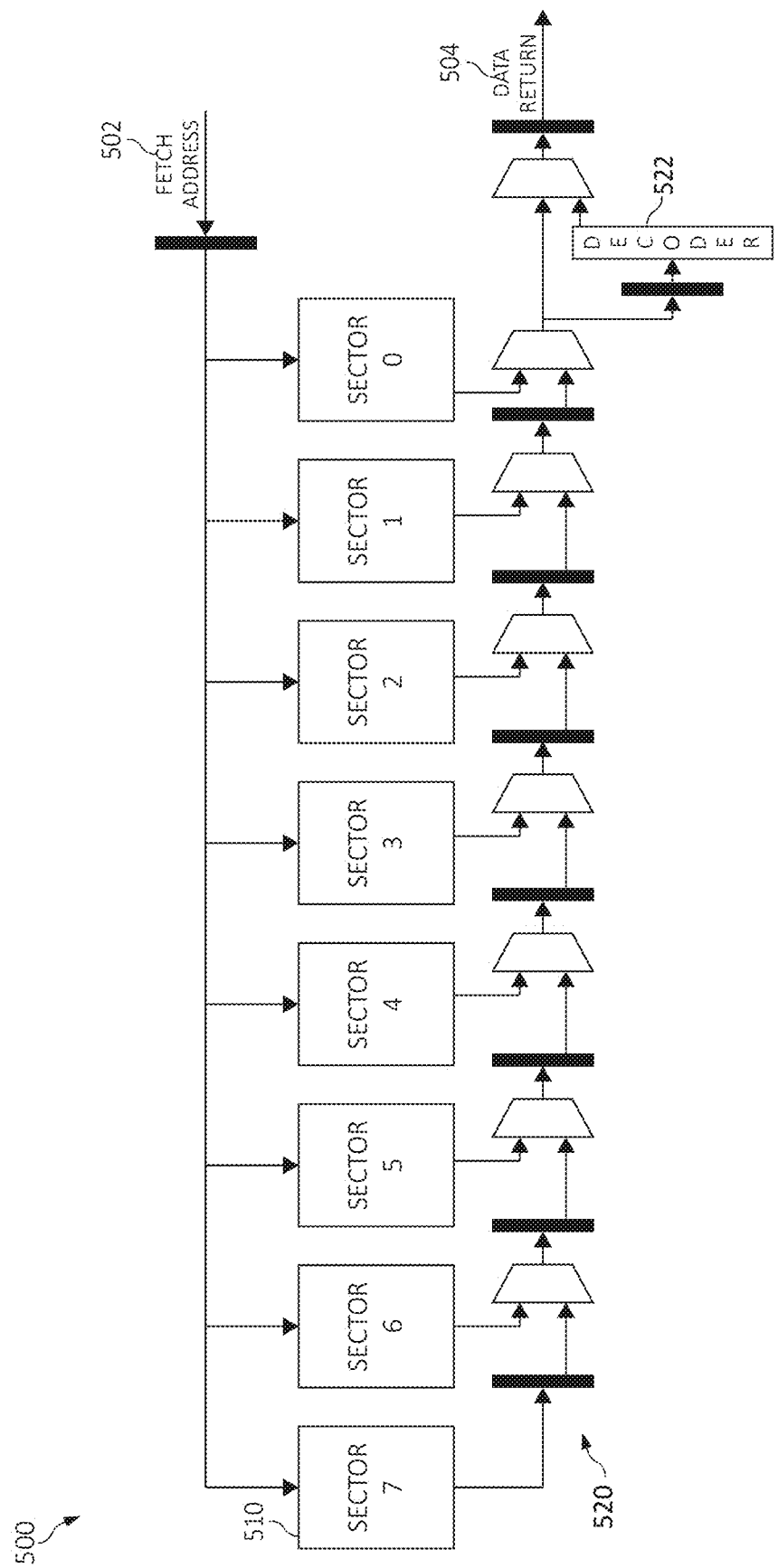
FIG. 5 is a block diagram depicting a cache layer for cache compression in a computing environment according to an embodiment of the present invention.

For further explanation, FIG. 5 is a block diagram depicting a cache layer such as, for example, an L3 cache layer, datapath for cache compression in a computing environment. In one aspect, one or more of the components, modules, services, applications, and/or functions described in FIGS. 1-4 may be used in FIG. 5. As shown, various blocks of functionality are depicted with arrows designating the blocks' of system 500 relationships with each other and to show process flow (e.g., steps or operations). Additionally, descriptive information is also seen relating each of the functional blocks' of system 500. As will be seen, many of the functional blocks may also be considered "modules" of functionality, in the same descriptive sense as has been previously described in FIGS. 1-4. Repetitive description of like elements employed in other embodiments described herein is omitted for sake of brevity.

With the foregoing in mind, the module blocks' of systems 500 may also be incorporated into various hardware and software components of a system integrating disaggregated memory in a cloud computing environment in accordance with the present invention. Many of the functional blocks of systems 500 may execute as background processes on various components, either in distributed computing components, or elsewhere.

As depicted, the system 500 depicts one or more sectors 510 such as, for example, sectors 0-7 that forms a certain byte size cache line (e.g., a 256 byte cache line). In one aspect, the sectors may include data written/read less than a line, with possibilities such as a hw (halfword), wd (word or 4 bytes), dw (doubleword or 8 bytes), qw (quadword or 16 bytes) or ow (octword or 32 bytes). For example, the sectors 510 may each be an octoword, which, for example, may be a group of 32 consecutive bytes on a 32-byte boundary. Thus, to return an entire cache line all 32 bytes of each octword is returned. Said differently, if the cache line is 256 bytes then eight 32 bytes are returned.

The sectors 510 are organized from right to left assuming a microprocessor cores is located on a right hand side (by way of example only) as indicated from the received input of the fetch address 502 and the data return 504. That is, the sectors 510 may be read and written from right to left sector 0 (e.g., OW0) to sector 7 (e.g., OW7). Each of the one or more sectors 510 may include one or more latches 520 all of which may be in communication with a decoder 522. Thus, sector 7 has a longer latency than sector 0 due to the several stages latches 520 positioned between each of the sectors 510. Thus, from a physical organization and due to the fact that the pipeline of the one or more sectors 510 takes up a large physical area, it is difficult and challenging to go from the left to the right in a single cycle due to a long distance and that it takes multiple cycles to make its way across that pipeline. Hence, those components described herein such as, for example, may be used to bookend the cache lines with the leftmost cache line having a greater than normal (e.g., greater than 2× higher) latency (such as, for example, access to a nearest sector of data is 8 cycles and hence to access a farthest sector is 15 cycles). Every cycle in access adds an nth percentage of (e.g., 1%) performance penalty and such latency that is desired to be eliminated has to do with placement of the compressed line and is in addition to any decompressor latency, where "n" is a positive integer.

Figure 6:
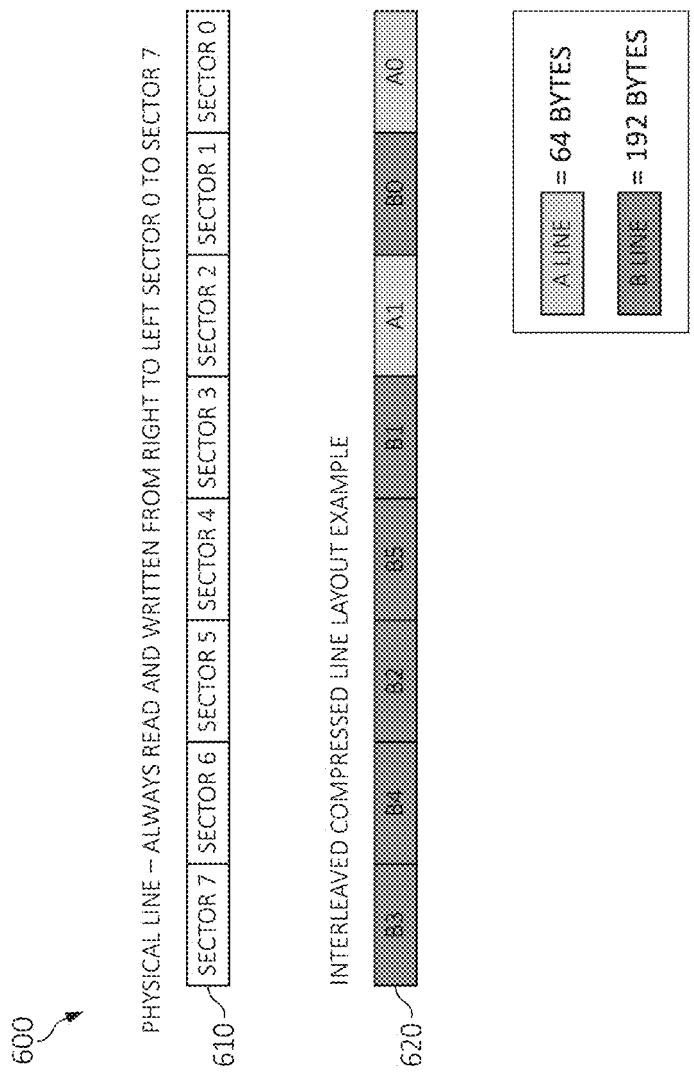
FIG. 6 is a block diagram depicting a compressed cache line in a computing environment according to an embodiment of the present invention.

FIG. 6 is a block diagram depicting a compressed cache line in a computing environment according to an embodiment of the present invention. In one aspect, one or more of the components, modules, services, applications, and/or functions described in FIGS. 1-5 may be used in FIG. 6. Repetitive description of like elements employed in other embodiments described herein is omitted for sake of brevity.

As depicted, a cache line 610 is displayed as a non-compressed, physical cache line that includes at least eight sectors forming a 256 byte line. However, the cache line 610 may be compressed and placed in the different sectors and sectors as depicted in cache line 620. The compressed cache line 620 depicts interleaved compressed cache lines for sectors 0-7. By way of example only, the A sectors total 64 bytes, and the B sectors total 192 bytes.

More specifically, the compressed cache lines are stored in an interleaved fashion in the 256-byte compressed cache line 620 so as to achieve lower latency. The sequential sectors occur every other sector and wrap-around at sector 7. This allows two non-equal sector lengths of A and B to be stored in the same physical line (e.g., the 256-byte compressed cache line 620), which increases compression efficiency (compared to requiring A and B to be each 128-byte maximum, by way of example only).

For example, using the 256-byte compressed cache line 620, an L3 cache line may be read/written in 32-byte beats in 8 cycles. Each sector (e.g., an octword) may be 32 bytes. By way of example only, the two compressed lines A and B are stored in the same 256-byte with sectors (octwords) stored in an interleaving fashion. It should be noted that the total size of the A lines and the total size of the B lines are equal to (or less than) the required 256-byte. Also, the total size of the A lines or the total size of the B lines are allowed to be equal to (or less than) 128-byte ("B"), by way of example only. That is, line A or line is not limited to 128B or less but can be more than 128B as long as the total is not, for example, more than 256B (e.g., the total size of the A lines and the total size of the B lines are equal to (or less than) the required 256-byte).

To further illustrate, the cache line 610 comprises multiple sectors such as, for example, eight 32 bytes sectors (e.g., eight octwords) to create the cache line 610. By compressing the cache line, for example, line A may comprise a total of 64 bytes, which may be stored and interleaved in cache line 620 by placing a portion of the compressed data of the 64 bytes into sector 0 and the alternative portion of the compressed data of the 64 bytes into sector 2. As depicted, a portion of the compressed data of the 192 bytes of line B are interleaved and placed in sectors 1 and sectors 3-7.

However, bookend layouts may be performed exist, but not preferable since the leftmost line has at least a higher latency. The A-line's compressed sector (e.g., octword) store order may be sector 0, sector 2, sector 4, sector 6, sector 7, sector 5, sector 3, sector 1. That is, the store order of the cache line subsectors may be to store in all even sectors (e.g., octwords) first, if longer than 128-byte and then turnaround and store in odd sectors (e.g., octwords), second. The B-line's compressed sector (e.g., octword) store order may be sector 1, sector 3, sector 5, sector 7, sector 6, sector 4, sector 2, and sector 0. Again, interleaving the cache lines is transparent to existing L3 logic. The compressed cache line 620 (e.g., a physical line) is always read and written in the array order of sector 0, sector 1, sector 2, sector 3, sector 4, sector 5, sector 6, and sector 7. The compression and decompression operations/engines may be aware of the layout of the compressed cache line 620 and may interleave and deinterleave the sectors (e.g., octwords) as needed.

Figure 7:
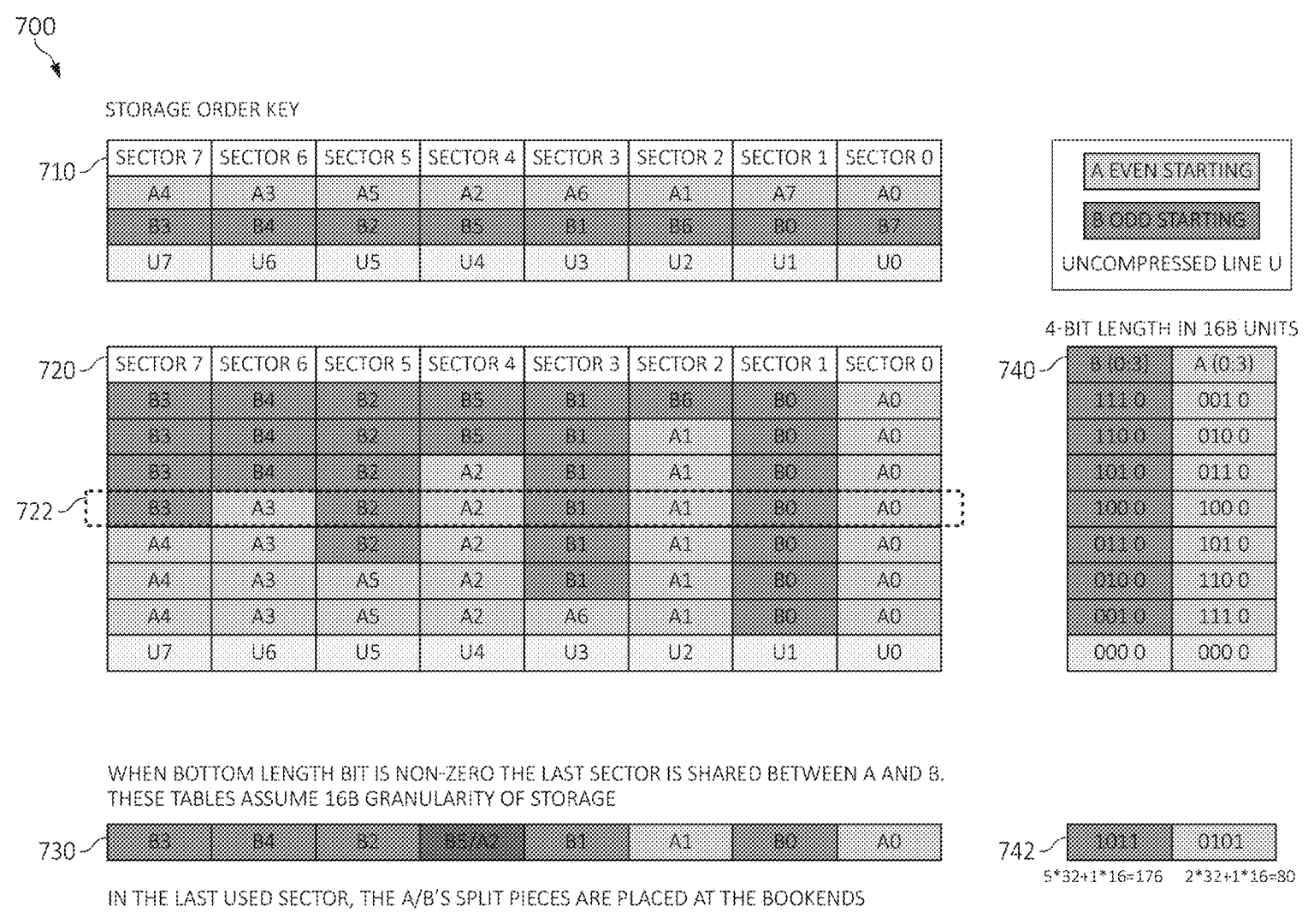

For further explanation, FIG. 7 is a block diagram 700 depicting a compressed cache line in a computing environment according to an embodiment of the present disclosure. In one aspect, one or more of the components, modules, services, applications, and/or functions described in FIGS. 1-6 may be used in FIG. 7. Repetitive description of like elements employed in other embodiments described herein is omitted for sake of brevity.

As depicted, a storage order key 710 provides instruction for saving and interleaving the cache lines. That is, storage order key 710 indicates the order for interleaving a first compressed cache line with a second compressed cache line into a single cache line such as, for example, the cache line 720 where data of the sectors of line A are stored in one or more defined sectors order in the cache line 720 and data of the sectors of line B are stored in one or more alternative sectors in the cache line 720. By way of example only, it should be noted that line A has 8 storage blocks such as, for example, A0-A7 and the number indicates the numerical order. Similarly, line B has 8 storage blocks such as, for example, B0-B7 and the number indicates the numerical order.

Table 740 depicts a line block size of 4-bit length for both line A (A0-A3) and line B (B0-B3). For example, table 740 tracks a number of 16 byte size blocks line A and line B consumes. Block diagram 742, depicts, by way of example only, the binary number for each 4-bit length block sizes.

As depicted, the storage order key 710 indicates for line A, A0 is stored in sector 0, A7 is stored in sector 1, A1 is stored in sector 2, A6 is stored in sector 3, A2 is stored in sector 4, A5 is stored in sector 5, A3 is stored in sector 6, and A4 is stored in sector 7. The storage order key indicates for line B, B7 is stored in sector 0, B0 is stored in sector 1, B6 is stored in sector 2, B1 is stored in sector 3, B5 is stored in sector 4, B2 is stored in sector 5, B4 is stored in sector 6, and B3 is stored in sector 7. The uncompressed lines ("U") may be stored in sectors 0-7.

As shown, a cache line 720 layout is depicted in a cache. In one implementation, assume both line A and line B are compressed down to 128 bytes in cache line 720, as indicated in cache line 722 (by way of example only), line A is stored in sector 0, sector 2, sector 4, and sector 6 and line B is stored in sector 1, sector 3, sector 5, and sector 7. By interleaving the compressed lines into the sectors, the amount of time to return the cache lines to a processing core will be almost the same each sector shifts right by one block at each cycle. In this example, line A is returned back one cycle faster than the line B, but each of the lines come back/return in substantially similar timeframes.

However, in some scenarios line A and line B may not be compressed down to equal number of sectors (e.g., 4 octwords each) or equal sizes of 128 bytes. For example, assume the line A has a high compressibility and line B does not have as great of compressibility as line A. As indicated in the storage order key 710, line A always starts in sector 0. Line B may then be stored in sector 1, sector 3, sector 5, and sector 7 and then work backward sector 6, sector 4, sector 2.

As line A grows, A0 is first stored in sector 0, then A1 is stored in sector 2, A2 is stored in sector 4, A3 is stored in the sector 6, and A4 is stored in sector 7. In the event, that line A needs a fifth block, then A5 consumes sector 5, which may have been required for the line B. Thus, as the lines get into the upper end, one or more sectors, working from right to left and then back left to right, may be consumed by line A or line B. To illustrate, assume line A in cache line 720 requires four sectors for A0, A1, A2, and A3 based on the compression, while line B compresses down to only three sectors for B0, B1, and B2. However, after a period of time, if line B became less compressible, line B could then use sector 7 for B3. Similarly, if line A needed more sectors for compression, line A would then also use sector 7.

Also, it should be noted as depicted in block 730, when bottom length bit is a non-zero the last sector may be shared between line A and line B. Also, the tables assume 16 byte granularity of storage. In the last used sector, line A/B's split pieced may be placed at the book ends. The line A/B split may be split according to a defined allocation granularity such as, for example, 16 bytes so the compression in is to be split in 16-byte blocks. Thus, the last sector (e.g., the B5/A2) split may be 16 bytes for line A and 16 bytes for line B. Alternatively, the last sector (e.g., the B5/A2) granularity may be set at 8 bytes and A2 of line A is receive a quarter of the sector and B5 could receive up to three-quarters of the sector.

It should be noted that the line size of 256 bytes may be user defined and the granularity (e.g., a number of sectors) of how many sections you divide the cash into is a function of bandwidth of how much data you can return back to a processing core in a cycle. The sub-granularity (e.g., a size of bits of a sector) of a 16-byte sector may be based on a tradeoff. To further explain granularity and sub-granularity, it is assumed a cache line is compressed and stored in a cache data array. The cache unit of storage may be called or referred to as a "sub granularity of data." Smaller sub-granularity has less cache data waste due to fragmentation but higher waste of directory. Larger sub granularity has high cache data waste due to fragmentation but smaller cost of directory space. For example, if the sub-granularity storage is 16B then 4 bits are needed in the directory for length or 16 bits for 1 byte subgranularity of storage or 1 bit for 128 byte subgranularity of storage.

Figure 8:
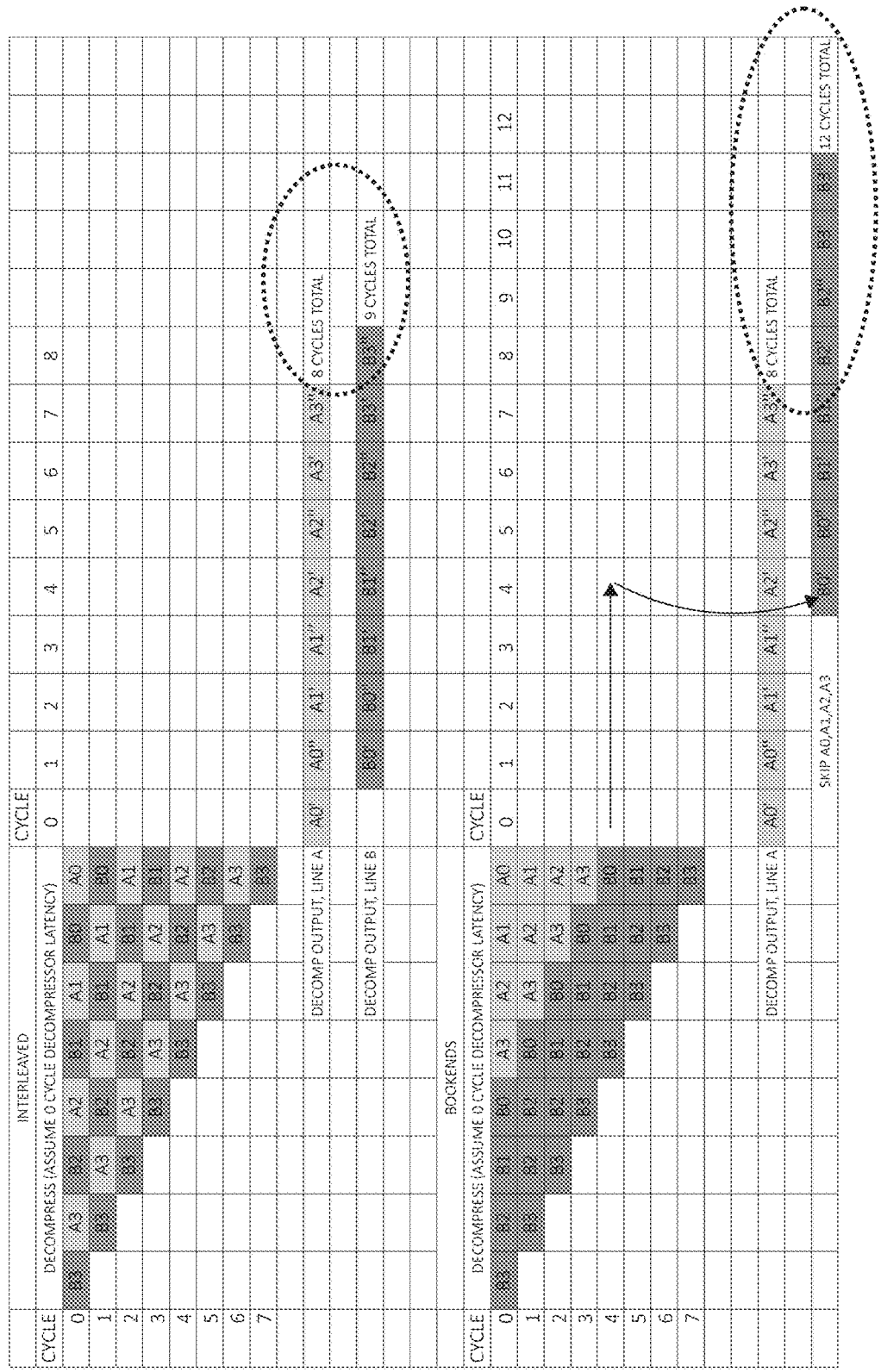
FIG. 8 is a block diagram depicting a timing chart comparing interleaving compared to bookending compressed cache line in a computing environment according to an embodiment of the present invention.

FIG. 8 is a block diagram depicting a timing chart 800 comparing interleaving compared to bookending compressed cache line in a computing environment according to an embodiment of the present invention.

As depicted, the timing chart 800 depicts eight cycles (e.g., cycle 0-7) with the interleaving and cycles displayed for comparison in the top chart while the bottom chart depicts the bookend operation. That is, the timing chart 800 depicts how the compressed data moves along the bus as a function of time. For example, the data shifts to the right as it moves towards the processing core on the bus until it reaches another latch point.

The timing chart 800 depicts also depicts the decompression output for line A and decompression output for line B. Line A may consume 8 cycles while line B may consume 9 cycles.

Figure 9A:
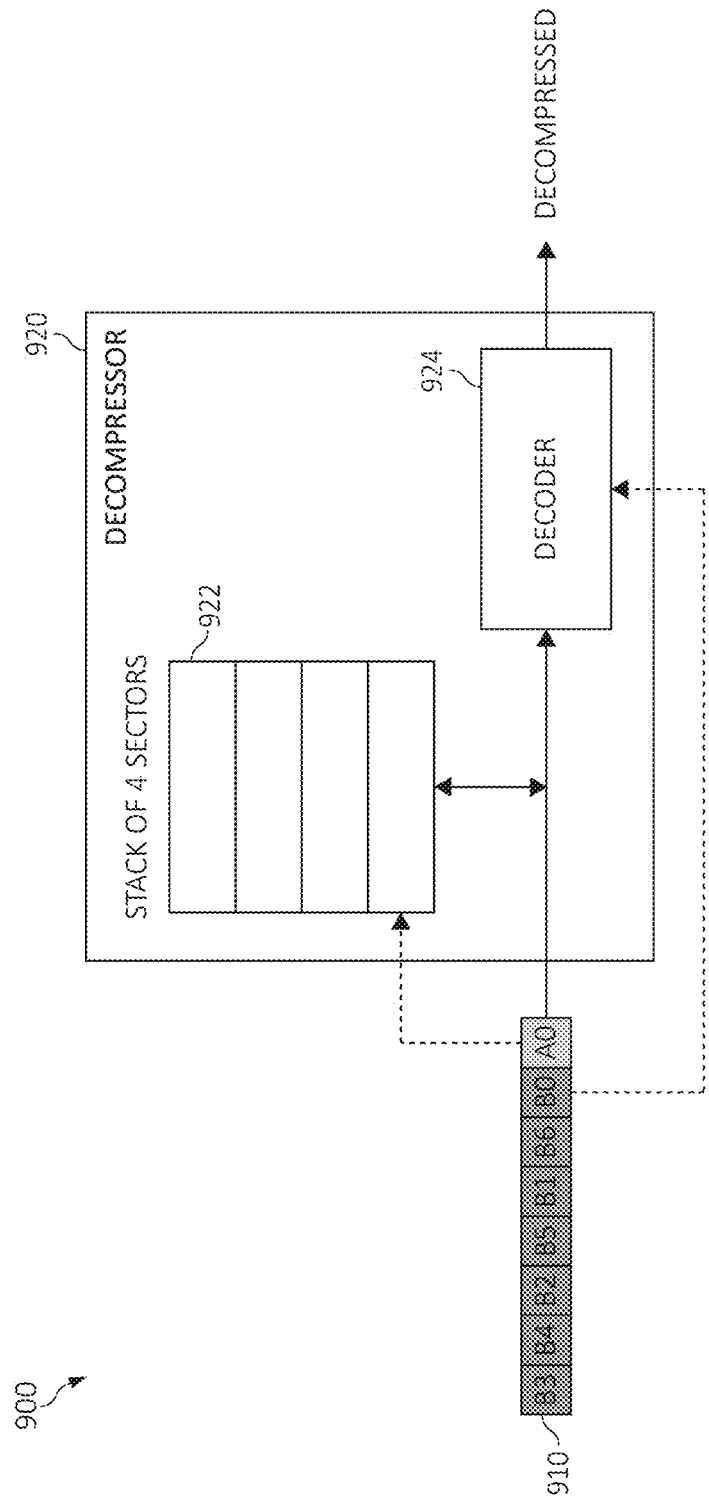
FIG. 9A is a block diagram depicting sorting out of order compressed cache lines in a computing environment according to an embodiment of the present invention.
Figure 9B:
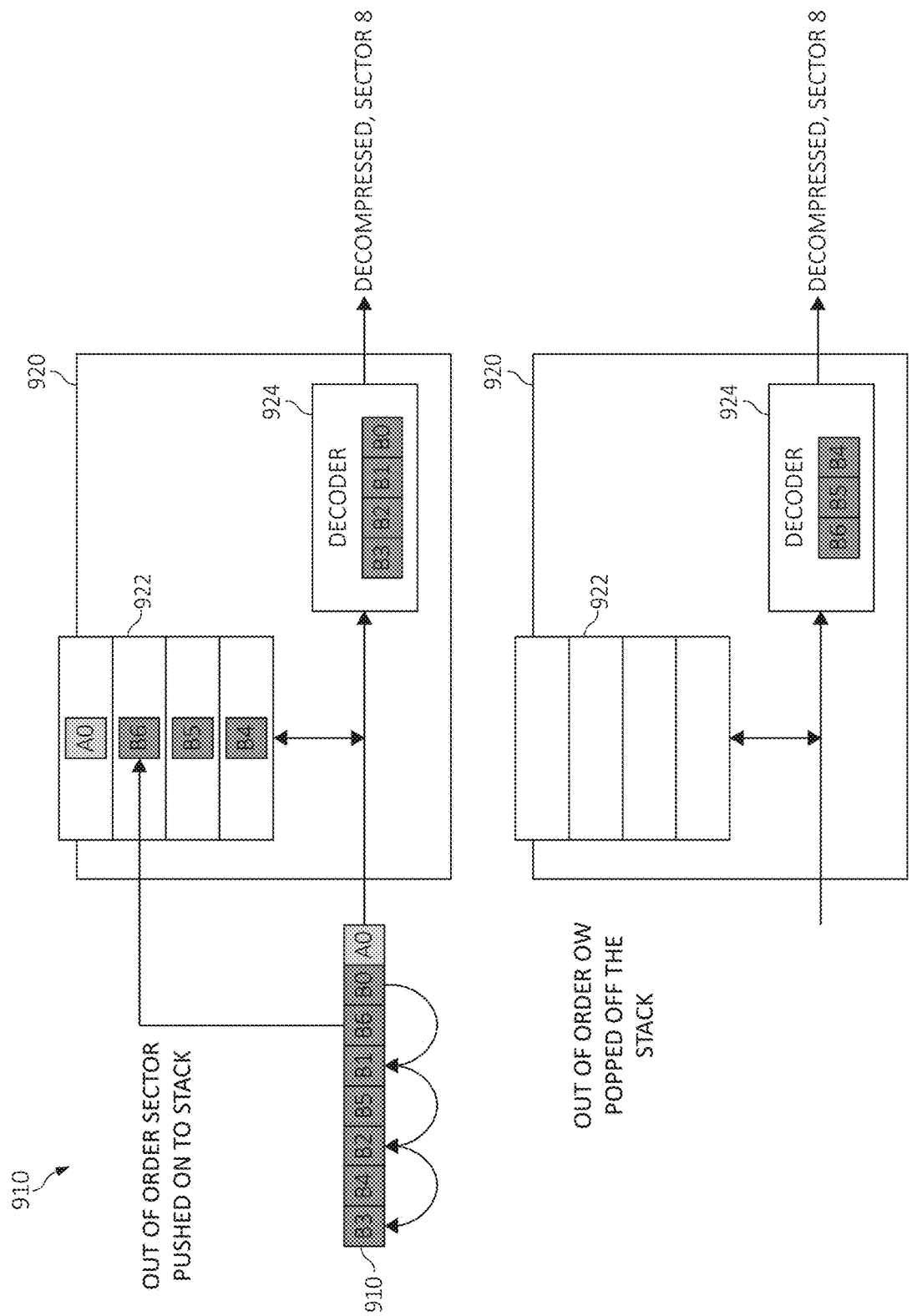
FIG. 9B is a block diagram depicting decompressing a second compressed cache line a computing environment according to an embodiment of the present invention.
Figure 9C:
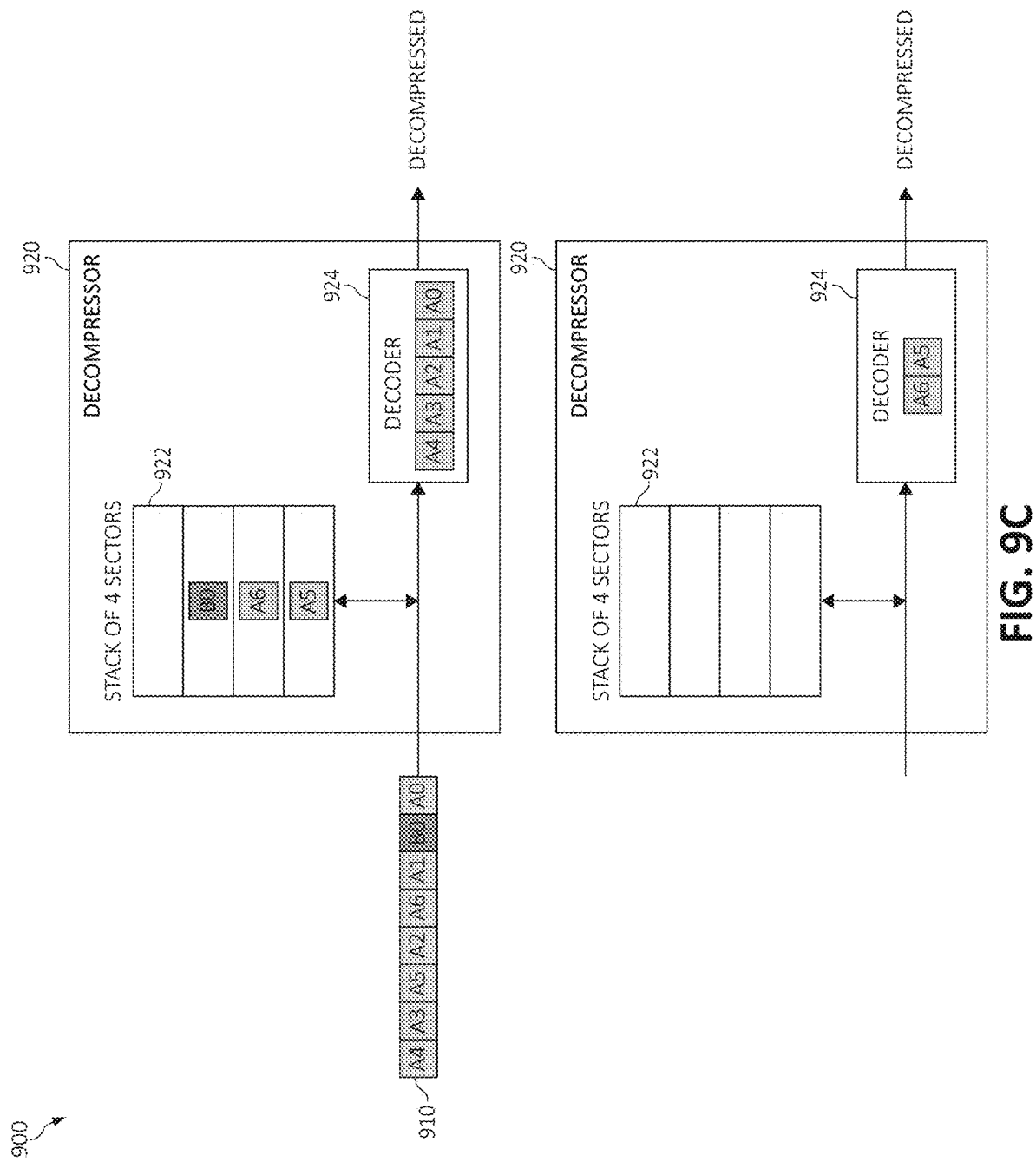
FIG. 9C is a block diagram depicting decompressing a first compressed cache line a computing environment according to an embodiment of the present invention.

Turning now to FIGS. 9A-9C, for providing lower latency in a cache. That is, FIG. 9A depicts operations for sorting out an order of items. FIG. 9B depicts decompressing a line stored starting with line B sectors with the storage order of sector 1, 3, 5, 7, 6, 4, 2, 0. FIG. 9C depicts decompressing a line stored starting with line A sectors with the storage order of sector 0, 2, 4, 6, 7, 5, 3, 1. Repetitive description of like elements employed in other embodiments described herein is omitted for sake of brevity.

FIG. 9A depicts a cache line 910 in communication with a decompressor 920. The decompressor 920 includes a decoder 924 and a stack of sectors (e.g., a stack of four sectors). The compressed cache line storage order is 1, 3, 5, 7, 6, 4, 2, and 0 and 0, 2, 4, 6, 7, 5, 3, and 1. The sectors may be read sequentially from the sectors 0-7. Depending on the line B or the line A is being read, out-of-order sectors are pushed on to the stack 922. The in-order sectors of the stack 922 are processed first such as, for example, processed by the decoder 924 for being decompressed. Then stacked storage sectors of the stack 922 are processed last. The stack 922 is part of the decompressor logic (e.g., 32×8×4=1024 latches for data and/or latches for parity/RAS "reliability, availability, and serviceability") of the decompressor 920. The compressed cache line format is transparent externally from the cache point of view. Decompressor logic handles the OW reordering internally.

To illustrate, assume it is intended to return line B. From a data ordering point of view, assume the line should be read B0, B1, B2, B3, B4, B5, B6, and B7. However, from a storage point of view, the data is scrambled in the compressed cache line as illustrated in compressed cache line 910. That is, from right to left, the data is stored B0 over B1 (e.g., B0 is stored in sector 1 and B1 is stored in sector 3), B1 over B2 (e.g., B1 is stored in sector 3 and B2 is stored in sector 5), and B2 over B3 (e.g., B2 is stored in sector 5 and B3 is stored in sector 7). Then working back from right to left, B3 over B4 (e.g., B3 is stored in sector 7 and B4 is stored is stored in sector 6), B4 over B5 (e.g., B4 is stored in sector 6 and B5 is stored is stored in sector 4, B5 over B6 (e.g., B5 is stored in sector 4 and B6 is stored is stored in sector 3), and B6 over B7 (e.g., similar to the others).

However, as the data comes into the processing core (e.g., the decompressor 920), the decompressor 920 will receive them out of order. For example, A0 is received first, B0 is received second, B6 is received third, B1 is received next, B5 is received after B1, and so forth. Thus, as depicted in FIG. 9B, A0 will enter the decompressor 920 and enter a queue such as, for example, place and stored in the stack 922. B0 will work its way over (e.g., left to right) and enter the decoder 924 and be decompressed. B6 will also be placed in the stack 922. B1 will enter the decompressor 920 and be decompressed by the decoder 924. B5 will also be placed in the stack 922 (e.g., placed in queue). B2 will enter the decompressor 920 and be decompressed by the decoder 924. B4 will also be placed in the stack 922 (e.g., placed in queue). B3 will enter the decompressor 920 and be decompressed by the decoder 924.

Then, once B3 is decompressed, B4 is obtained from the stack 922 and decompressed by the decoder 924. B5 and then B6 are also obtained from the stack 922 and decompressed by the decoder 924.

Similarly, as depicted in FIG. 9C, it is intended to return line A rather than line B. From a proper data ordering point of view, assume the line should be read A0, A1, A2, A3, A4, A5, A6, and A7. However, from a storage point of view, the data is scrambled in the compressed cache line as illustrated in compressed cache line 910. That is, from right to left, the data is stored A0 over A1 (e.g., A0 is stored in sector 0 and A1 is stored in sector 2), A1 over A2 (e.g., A1 is stored in sector 2 and A2 is stored in sector 4), and A2 over A3 (e.g., A2 is stored in sector 4 and A3 is stored in sector 6), and A3 over to A4 (e.g., A3 is stored in sector 6 and A4 is stored in sector 7). Then working back from right to left, A4 over A5 (e.g., A4 is stored in sector 7 and A5 is stored is stored in sector 5, A5 over A6 (e.g., A5 is stored in sector 5 and A6 is stored is stored in sector 3), and A6 over A7 (e.g., similar to the others).

However, as the data comes into the processing core (e.g., the decompressor 920), the decompressor 920 will receive them out of order. For example, A0 is received first, B0 is received second, A1 is received third, A6 is received next, A2 is received after A6, and so forth. Thus, as depicted in FIG. 9C, A0 will enter the decompressor 920 be decompressed by the decoder 924. B0 will stay in the stack. B0 will enter a queue such as, for example, place and stored in stack 922. A1 will enter the decompressor 920 and be decompressed by the decoder 924. A6 will enter the decompressor 920 and enter a queue such as, for example, placed and stored in the stack 922. A2 will then enter the decompressor 920 and be decompressed by the decoder 924. A6 will also be placed in the stack 922. A3 and A4 will enter the decompressor 920 and be decompressed by the decoder 924. Then, once A4 is decompressed, A5 is obtained from the stack 922 and decompressed by the decoder 924. A6 is also obtained from the stack 922 and decompressed by the decoder 924.

In this way, by use of the stack 922, the compressed cache line may enter the decompressor 920 out of order, but the data is decompressed according to the storage order. That is, line A may be a compressed cache line interleaved with line B, a second compressed cache line into a single cache line 910, and then decompressed according to the proper order of storage (e.g., storage order for B0, B1, B2, B3, B4, B5, B6, and B7 or A0, A1, A2, A3, A4, A5, A6, and A7 for a given/specific fetch request) in the single cache line 910. That is, for a specific fetch request, only line A or only line B will be decoded.

Figure 10:
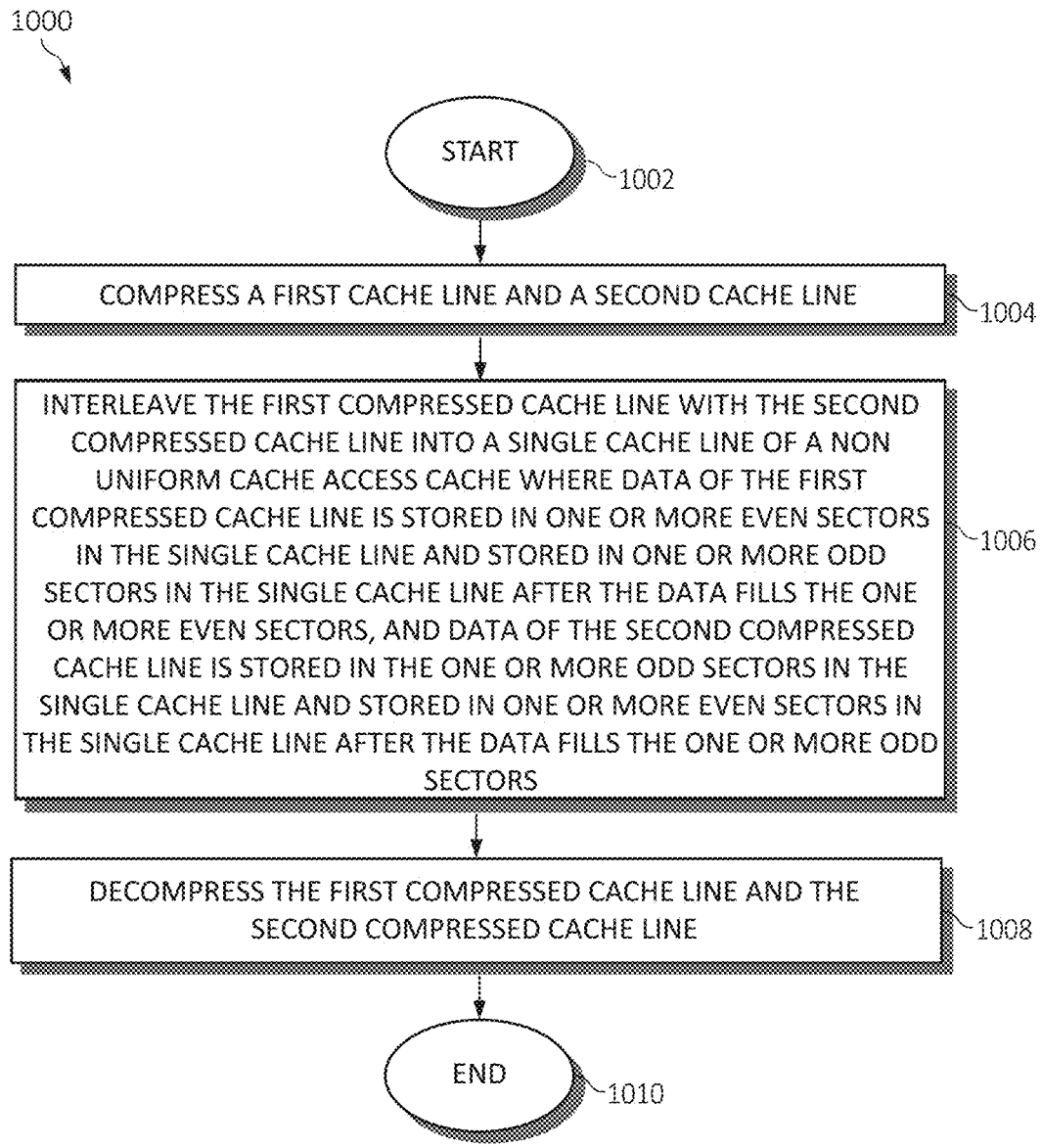
FIG. 10 is a flowchart diagram depicting an additional exemplary method for providing lower latency in a non-uniform cache access ("NUCA") cache in a computing environment according to an embodiment of the present invention.

Turning now to FIG. 10, a method 1000 for providing lower latency in a non-uniform cache access ("NUCA") cache in a computing environment using a processor is depicted, in which various aspects of the illustrated embodiments may be implemented. The functionality 1000 may be implemented as a method (e.g., a computer-implemented method) executed as instructions on a machine, where the instructions are included on at least one computer readable medium or one non-transitory machine-readable storage medium. The functionality 1000 may start in block 1002.

A first compressed cache line and a second cache line may be compressed, as in block 1004. The first compressed cache line may be interleaved with a second compressed cache line into a single cache line of the NUCA cache where data of the first compressed cache line is stored in one or more even sectors in the single cache line and stored in zero or more odd sectors in the single cache line after the data fills the one or more even sectors (e.g., allowed to use the odd sectors after the even sectors are used up) and data of the second compressed cache line is stored in the one or more odd sectors in the single cache line and stored in zero or more even sectors in the single cache line after the data fills the one or more odd sectors (e.g., allowed to use the even sectors after the odd sectors are used up), as in block 1006. The first compressed cache line and/or the second compressed cache line may be decompressed (e.g., making a fetch to get cache line X, where X may be the first cache line that is fetched and/or the second compressed cache line that is fetched), as in block 1008. It should be noted that for a specific fetch, only line A or only line B will be decoded. The functionality 1000 may end, as in block 1010.

In one aspect, in conjunction with and/or as part of at least one blocks of FIG. 10, the operations of method 1000 may include each of the following. The operations of method 1000 may track a number of the one or more even and odd sectors consumed by the first compressed cache line. The operations of method 1000 may track a number of the one or more even and odd sectors consumed by the second compressed cache line. Thus, the first compressed cache line may occupy both even and odd sectors. Hence, tracking is a total number of sectors (e.g., odd and even). That is, for the first compressed line, which starts in even sectors, it may extend into the odd sectors if needed. Therefore, odd sector usage is zero or more. Similarly, for the second compressed line, which starts in the odd sectors, will only use even sectors if needed (and fits) and hence leverages zero or more even sectors, not one or more even sectors.

That is, the operations of method 1000 may track data of the first compressed cache line that is stored in one or more even sectors in the single cache line and stored in zero or more odd sectors in the single cache line after the data fills the one or more even sectors. The operations of method 1000 may track data of the second compressed cache line that is stored in the one or more odd sectors in the single cache line and that is stored in zero or more even sectors in the single cache line after the data fills the one or more odd sectors. Thus, the operations of method 1000 may track a total number of even and odd sectors for all compressed cache lines.

The operations of method 1000 may compress the first compressed cache line prior to the interleaving with the second cache line. The operations of method 1000 may compress the second compressed cache line prior to the interleaving with the first cache line.

The operations of method 1000 may decompress data of the one or more even and/or odd sectors of the first compressed cache line based on a sequential order of the compressed scheme (e.g., the order of compression). The operations of method 1000 may decompress data of the one or more even and/or odd sectors of the second compressed cache line based on an order in which the second compressed cache line was interleaved with the first cache line.

That is, the method 1000 may decompress data of the one or more even and/or odd sectors of the first compressed cache line according to a compression order, and decompress data of the one or more even and/or odd sectors of the second compressed cache line according to the compression order. The decompression occurs in the order of sequential nature (byte order) with respect to the cache line of focus.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing lower latency in a non-uniform cache access ("NUCA") cache in a computing environment by one or more processors comprising:
    interleaving a first compressed cache line with a second compressed cache line into a single cache line of the NUCA cache by:
        initially storing data of the first compressed cache line in one or more even sectors of a plurality of evenly numbered sectors in the single cache line;
        responsive to all of the plurality of evenly numbered sectors being filled with the data of the first compressed cache line, storing remaining data of the first compressed cache line in available odd sectors of a plurality of oddly numbered sectors in the single cache line;
        initially storing data of the second compressed cache line in one or more odd sectors of the plurality of oddly numbered sectors in the single cache line; and
        responsive to all of the plurality of oddly numbered sectors being filled with the data of the second compressed cache line, storing remaining data of the second compressed cache line in available even sectors of the plurality of evenly numbered sectors in the single cache line.

2. The method of claim 1, further including tracking a number of the one or more even sectors and the available odd sectors consumed by the first compressed cache line.

3. The method of claim 1, further including tracking a number of the available even sectors and the one or more odd sectors consumed by the second compressed cache line.

4. The method of claim 1, further including compressing the first compressed cache line prior to the interleaving with the second cache line.

5. The method of claim 1, further including compressing the second compressed cache line prior to the interleaving with the first cache line.

6. The method of claim 1, further including decompressing data of the one or more even sectors and the available odd sectors of the first compressed cache line according to a compression order.

7. The method of claim 1, further including decompressing data of the available even sectors and the one or more odd sectors of the second compressed cache line according to a compression order.

8. A system for providing lower latency in a non-uniform cache access ("NUCA") cache in a computing environment, comprising:
    a hardware memory storing executable instructions; and
    a hardware processor executing the executable instructions, wherein, when executed, the executable instructions cause the hardware processor to:
        interleave a first compressed cache line with a second compressed cache line into a single cache line of the NUCA cache by:
            initially storing data of the first compressed cache line in one or more even sectors of a plurality of evenly numbered sectors in the single cache line;
            responsive to all of the plurality of evenly numbered sectors being filled with the data of the first compressed cache line, storing remaining data of the first compressed cache line in available odd sectors of a plurality of oddly numbered sectors in the single cache line;
            initially storing data of the second compressed cache line in one or more odd sectors of the plurality of oddly numbered sectors in the single cache line; and
            responsive to all of the plurality of oddly numbered sectors being filled with the data of the second compressed cache line, storing remaining data of the second compressed cache line in available even sectors of the plurality of evenly numbered sectors in the single cache line.

9. The system of claim 8, wherein the executable instructions, when executed, further cause the hardware processor to track a number of the one or more even sectors and the available odd sectors consumed by the first compressed cache line.

10. The system of claim 8, wherein the executable instructions, when executed, further cause the hardware processor to track a number of the available even sectors and the one or more odd sectors consumed by the second compressed cache line.

11. The system of claim 8, wherein the executable instructions, when executed, further cause the hardware processor to compress the first compressed cache line prior to the interleaving with the second cache line.

12. The system of claim 8, wherein the executable instructions, when executed, further cause the hardware processor to compress the second compressed cache line prior to the interleaving with the first cache line.

13. The system of claim 8, wherein the executable instructions, when executed, further cause the hardware processor to decompress data of the one or more even sectors and the available odd sectors of the first compressed cache line according to a compression order.

14. The system of claim 8, wherein the executable instructions, when executed, further cause the hardware processor to decompress data of the available even sectors and the one or more odd sectors of the second compressed cache line according to a compression order.

15. A computer program product for providing lower latency in a non-uniform cache access ("NUCA") cache in a computing environment, the computer program product comprising:
   one or more computer readable storage media, and program instructions collectively stored on the one or more computer readable storage media, the program instruction comprising:
   program instructions to interleave interleaving a first compressed cache line with a second compressed cache line into a single cache line of the NUCA cache by:
      initially storing data of the first compressed cache line in one or more even sectors of a plurality of evenly numbered sectors in the single cache line;
      responsive to all of the plurality of evenly numbered sectors being filled with the data of the first compressed cache line, storing remaining data of the first compressed cache line in available odd sectors of a plurality of oddly numbered sectors in the single cache line;
      initially storing data of the second compressed cache line in one or more odd sectors of the plurality of oddly numbered sectors in the single cache line; and
      responsive to all of the plurality of oddly numbered sectors being filled with the data of the second compressed cache line, storing remaining data of the second compressed cache line in available even sectors of the plurality of evenly numbered sectors in the single cache line.

16. The computer program product of claim 15, further including program instructions to track a number of the one or more even sectors and the available odd sectors consumed by the first compressed cache line.

17. The computer program product of claim 15, further including program instructions to track a number of the available even sectors and the one or more odd sectors consumed by the second compressed cache line.

18. The computer program product of claim 15, further including program instructions to compress the first compressed cache line prior to the interleaving with the second cache line.

19. The computer program product of claim 15, further including program instructions to compress the second compressed cache line prior to the interleaving with the first cache line.

20. The computer program product of claim 15, further including program instructions to:
   decompress data of the one or more even sectors and the available odd sectors of the first compressed cache line according to a compression order; and
   decompress data of the available even sectors and the one or more odd sectors of the second compressed cache line according to the compression order.

* * * * *